(12) United States Patent
Moll

(10) Patent No.: US 7,914,634 B2
(45) Date of Patent: Mar. 29, 2011

(54) USE OF IONOMERS FOR SEALING INSULATING MATERIALS

(75) Inventor: Lothar Moll, Schwetzingen (DE)

(73) Assignee: Biologische Insel Lothar Moll GmbH & Co. KG, Schwetzingen (DE)

(*) Notice: Subject to any disclaimer, the term of this patent is extended or adjusted under 35 U.S.C. 154(b) by 0 days.

(21) Appl. No.: 11/768,322

(22) Filed: Jun. 26, 2007

(65) Prior Publication Data

US 2008/0020143 A1 Jan. 24, 2008

Related U.S. Application Data

(62) Division of application No. 10/471,214, filed as application No. PCT/EP02/02439 on Mar. 6, 2002, now Pat. No. 7,442,659.

(30) Foreign Application Priority Data

Mar. 8, 2001 (DE) .................................. 101 11 319
Jul. 26, 2001 (DE) .................................. 101 36 089

(51) Int. Cl.
| | | |
|---|---|---|
| C08F 20/44 | (2006.01) |
| C08F 20/50 | (2006.01) |
| C08F 120/44 | (2006.01) |
| C08F 120/50 | (2006.01) |
| C08F 20/56 | (2006.01) |
| C08F 120/56 | (2006.01) |
| C08F 220/56 | (2006.01) |
| C08F 20/02 | (2006.01) |
| C08F 20/62 | (2006.01) |
| C08F 120/02 | (2006.01) |
| C08F 220/02 | (2006.01) |
| C08F 220/62 | (2006.01) |
| C08F 20/10 | (2006.01) |
| C08F 120/10 | (2006.01) |
| C08F 220/10 | (2006.01) |
| B29C 65/00 | (2006.01) |
| B31B 1/60 | (2006.01) |
| B32B 37/00 | (2006.01) |
| E04B 2/00 | (2006.01) |
| E04F 13/00 | (2006.01) |

(52) U.S. Cl. ............... 156/60; 525/329.1; 525/329.4; 525/329.7; 525/330.3; 156/71

(58) Field of Classification Search ............ 156/60, 156/71; 525/329.1–330.3
See application file for complete search history.

(56) References Cited

U.S. PATENT DOCUMENTS

| | | | |
|---|---|---|---|
| 3,264,272 A | 8/1966 | Rees | |
| 3,651,183 A | 3/1972 | Hosoda et al. ............... 264/54 |
| 3,939,972 A * | 2/1976 | Mayworm ............... 206/219 |
| 4,265,949 A * | 5/1981 | Kugimiya ............... 383/106 |
| 4,324,872 A | 4/1982 | Lakshmanan ............... 525/274 |

(Continued)

FOREIGN PATENT DOCUMENTS

CA 2215502 C * 10/1996

(Continued)

OTHER PUBLICATIONS

German Standard DIN 52615, "Testing of Thermal Insulation; Determination of Water Vapour Permeability of Building and Insulating Materials", Nov. 1987, Beuth Verlag GmbH, Berlin, pp. 1-5 (discussed in specification).

(Continued)

Primary Examiner — Philip C Tucker
Assistant Examiner — Michael N Orlando
(74) Attorney, Agent, or Firm — Hudak, Shunk & Farine Co. LPA

(57) ABSTRACT

In a method for sealing an insulating material for construction applications, the insulating material is sealed with a material sheet including an ionomer so as to provide a vapor retarder for the insulating material.

18 Claims, 1 Drawing Sheet

U.S. PATENT DOCUMENTS

| | | | |
|---|---|---|---|
| 4,550,141 A | 10/1985 | Hoh | 525/221 |
| 4,645,710 A | 2/1987 | Baitinger et al. | 428/317.7 |
| 4,770,837 A * | 9/1988 | Lu et al. | 264/503 |
| 5,695,870 A * | 12/1997 | Kelch et al. | 428/318.4 |
| 5,763,062 A * | 6/1998 | Smith et al. | 428/215 |
| 5,891,500 A | 4/1999 | Brodie, III | 426/415 |
| 6,059,112 A | 5/2000 | Dykstra et al. | 206/438 |
| 6,808,772 B2 | 10/2004 | Kunzel et al. | |
| 6,890,666 B2 | 5/2005 | Kunzel et al. | |

FOREIGN PATENT DOCUMENTS

| | | |
|---|---|---|
| DE | 19514420 | 3/1997 |
| DE | 19902102 | 12/1999 |
| JP | 04059247 | 2/1992 |
| WO | WO 93/02853 | 2/1993 |

OTHER PUBLICATIONS

Römpp's Chemical Dictionary, "Ionomere", p. 2041, published by Georg Thieme Verlag Stuttgart, New York, $9^{th}$ Edition, 1990 (discussed in specification).

DuPont, Company Brochure on "Surlyn", dated Jan. 2001 (discussed in specification).

JP-A-4059247, Feb. 26, 1992, Derwent Abstract.

DIN 38 406 (German Industry Standard 38 406), "German Standard Methods for the Examination of Water, Waste Water and Sludge", Deutsches Institut für Normung e.V., Berlin, Jul. 1992, pp. 1-8 (discussed in specification).

* cited by examiner

USE OF IONOMERS FOR SEALING INSULATING MATERIALS

This application is a divisional of application Ser. No. 10/471,214 filed Sep. 8, 2003, now U.S. Pat. No. 7,442,659, which is a U.S. national phase of International Patent Application No. PCT/EP2002/02439, filed Mar. 6, 2002, and claims the benefit of German Patent Application No. 101 11 319.6, filed Mar. 8, 2001, and German Patent Application No. 101 36 089.4, filed Jul. 26, 2001, which are all incorporated by reference herein.

The present invention relates generally to insulating materials. In particular, it relates to the use of layered materials sealing insulating insulating materials, said materials containing at least one layer of ionomers, and it also relates to such layered materials themselves. The invention especially relates to flat impregnated materials containing ionomers as the impregnating resin.

BACKGROUND

The use of insulating materials such as, for example, plastic foams and glass wool for the comprehensive thermal insulation of buildings is generally known in numerous configurations. In one of the configurations most frequently employed, panels of the insulating material having a thinness of about 4 cm to 40 cm are attached in or on wall constructions or else under the roof between, underneath or on the rafters.

However, the insulating materials only exercise their full effect if they prevent air exchange through them since otherwise, considerable amounts of heat would be lost with the air that diffuses from the heated interior to the outside. This situation would be reversed in the summer, when the warm air penetrates inside, heating up the building in an unwanted manner, with the result that an air conditioning system that might be present would consume considerably more energy.

Consequently, at first it seemed to be an obvious approach to seal the thermal insulating materials with a material that is impermeable to air, for example, a sturdy polyethylene or PVC film, but this did not bring about the desired result because it is practically impossible to avoid the occurrence of damage such as cracks or holes, so that air nevertheless manages to get into the insulating material. When the air cools down, the entrained moisture condenses out, so that over the course of time, there are considerable water accumulations which can practically no longer be eliminated by drying. In the meantime, the water not only causes corrosive damage but it also reduces the effect of the thermal insulation.

As is like wise common knowledge, preference is thus given to those sealing materials that counteract but do not entirely prevent diffusion of the air and of the water vapor contained in it, so as to allow a reverse diffusion of the water vapor, in other words, drying of the insulating material.

Such materials, which are referred to as vapor retarders and which are normally employed in the form of films or layered materials, are polymers such as polyethylene, polyamides, ethylene acrylic acid copolymers and polyesters in a thin layer. More information on this can be found, from example, in the patent specifications DE-A 195 14 420 and 199 02 102.

The vapor retarders made of these materials, in the form of a film or of a suitable layered material, usually entail the advantage that their resistance against the diffusion of the water vapor is dependent on the relative humidity. If the relative humidity is low, this resistance is higher than when the relative humidity is height. This facilitates the dry of the damp insulating materials in the summer air, which is usually humid. For instance, the water vapor diffusion resistance value ($s_d$ value) according to German standard DIN 52165 of a 60-µm thick polyamide film amounts to 4.5 m at 3% relative humidity and only approximately 0.5 m at 80% relative humidity.

The $s_d$ value corresponds to the thickness of a stationary air layer whose diffusion resistance is as high as that of the specimen, that is to say, the thin polyamide-6 film in this example. This value is ascertained according to German standard DIN 52615, usually employing the dry cup method (dry area procedure), between the two humidity values of 0% and 50%, averaging 25%, and employing the wet cup method (damp area procedure), between the two humidity values of 50% and 95%, averaging 72.5%.

SUMMARY OF THE INVENTION

However, it is not only the above-mentioned requirements in terms of diffusion properties that are made of the material used for the vapor retarders, but rather, a number of other conditions as well. Thus, the material should be thermally, chemically and mechanically stable as well as easy to process. Moreover, the material should be physiologically safe, it should become only slightly or not at all statically charged, and it should also be compatible with other materials, especially with those of which the layers are made, so that decomposition of the layered materials cannot occur. The material should be environmentally safe and, in case of fire, it should not release any highly toxic gases of the type that can be formed, for example, by halogen compounds from flame retardants in the form of dioxins and furans or by polyamide in the form of ammonia and polyethane hydrogen cyanide. Last but not least, it should also meet the requirements of cost-effectiveness.

The present invention provides a method for sealing an insulating material for construction applications. The method includes:
  providing at least one layer of the insulating material; and
  sealing the insulating material with a material sheet including an ionomer so as to provide a vapor retarder for the insulating material.

According to the invention, ionomers are very well-suited in order to seal insulating materials, in addition to which new layered materials were found which contain this material as a component in at least one layer. Embodiments of the invention are described below.

BRIEF DESCRIPTION OF THE DRAWINGS

The invention is elaborated upon below based exemplary embodiments with reference to the drawings, in which.

DETAILED DESCRIPTION

Figure 1:
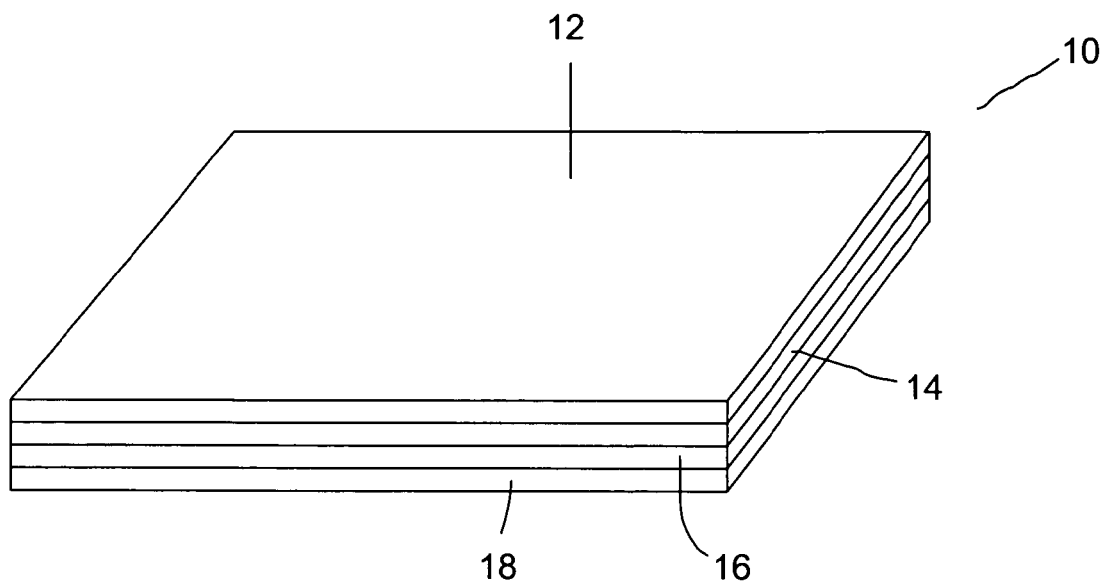
FIG. 1 shows a perspective view of a layered material.

By definition (see, for example Römpps Chemielexikon [Römpps Chemical Dictionary], published by George Thieme Verlag, 9th edition, 1990), ionomers are statistical thermoplastic copolymers consisting of
  a) a mono-olefin,
  b) a mono-olefinically unsaturated acid,
  c) if desired, additional comonomers for purposes of modifying the chemical and physical properties of these copolymers, whereby
  d) the acid groups of these copolymers are partially or totally neutralized with inorganic cations.

Many of these ionomers as well as the methods for their production are known from the technical literature and a number of them are commercially available under the designation Surlyn®, manufactured by the DuPont company, which recommends their use for packaging applications and coating purposes. Additional information can be found, for instance, in U.S. Pat. No. 3,264,272 as well as in the company brochure on Surlyn® dated January 2001.

Examples of comonomers (a) are especially ethylene and also propylene and 1-butene as well as mixtures of these compounds. Their proportion in the ionomer normally amounts to 50 mol-% to 99 mol-%, preferably 80 mol-% to 90 mol-%.

Suitable comonomers (b) are especially methacrylis acid also acrylic acid, maleic acid, maleic acid anhydride and vinyl sulfonic acid in proportions of 1 mol-% to 50 mol-%, preferably 10 mol-% to 20 mol-%.

Examples of additional comonomers (c) are mono-olefinically unsaturated compounds such as acrylic acid and methacrylic acid $C_1$-$C_4$ alkyl esters as well as stryrene, vinyl acetate, vinyl propionate, acrylamide, methacrylamide, acrylonitrile, methacrylonitrile in proportions of up to 10 mol-%. For the mechanical and chemical properties of the films, it can also be advantageous to add small amounts of bifunctional monomers, such as butadiene, provided that the material remains thermoplastic.

Preferred inorganic cations (d) are especially those of the alkali metals, such as particularly lithium, sodium and potassium as well as the earth-alkali metals like calcium and magnesium. Zinc cations are also suitable. The degree of neutralization of the acid groups normally ranges from 0.5% to 100%, preferably from 10% to 70%. This corresponds to a metal content of the ionomer within the range of about 0.1% to 10% by weight, preferably 1% to 5% by weight.

In an embodiment of the present invention, the ionomers consist of:
- $a_1$) 50 mol-% to 99 mol-% ethylene and
- $b_1$) 1 mol-% to 50 mol-% methacrylic acid, whereby
- $d_1$) the acid groups of these copolymers are 0.5% to 100%-neutralized, preferably 10% to 70%-neutralized, with lithium, sodium, magnesium, potassium and/or zinc cations.

These ionomers have outstanding application and processing properties, in addition to which, as was ascertained according to the invention, they fulfill the requirements made of an effective vapor-retarder material. This is particularly true of the Surlyn grades having sodium as cations, like type 1605 as well as of the types of the 8000 series, for instance, 8120, 8140 and 8220. Films made of these materials and having a thickness of 15 µm display an $s_d$ value between 3 m and 10 m at 25% relative humidity and an $s_d$ value between 0.5 m and 4 m at 72.5% relative humidity, whereby the differences $\Delta s_d$ 25/72.5 that are characteristic of the diffusion behavior lie within the range of 2 m to 8 m.

Generally speaking, the $\Delta s_d$ 25/72.5 value increases as the polarity of the material rises. Consequently, ionomers with potassium as component (d) have especially high differential values, so that seals according to the invention made of this material meet even extreme requirements, for instance, in the case of buildings in mountainous climates with their often pronounced temperature differences and also in tropical and subtropical climates, as well as in flat roof and grass roof constructions.

However, it is not only the $\Delta s_d$ value that is an important criterion for the performance of a moisture-variable vapor retarder, but rather, also the ratio f of the higher resistance value $\Delta s_d$ to the lower resistance value $\Delta s_{d1}$. After all, it is necessary to take into account not only the moisture variability of the vapor retarder itself, but also its output, that is to say, the diffusion of a vapor volume m per unit of time. The following inversely proportional relationship applies for the ratio of the diffusing vapor volume $m_h$ and $m_l$ at a high or low diffusion resistance $s_d$ and $s_{d1}$, respectively:

$$F = S_{DH}/S_{D1} = M/1/M/H$$

which indicates that the large the diffusion resistance, the smaller the volume of vapor passing per unit of time and vice versa.

Regarding the output, the $s_{d1}$ at 25% relative humidity should be within the range from 1 m to 20 m, preferably from 1 m to 4 m, and the $s_{d1}$ within the range from 0.02 m to 4 m, preferably from 0.02 m to 2 m, but, due to the moisture variability, they should nevertheless differ from each other markedly by a factor f that preferably is >2, especially >5.

This requirement is fulfilled particularly well by the potassium ionomers.

Vapor retarders having such characteristics not only function in a moisture variable manner, but they also account for faster drying processes.

Thus, it is achieved that, in a winter climate, when the vapor retarder according to the invention lies, for example, within the range from 25% to 50% relative humidity, only a moisture from of approximately 1 to 10 g/m² can penetrate the insulation every 24 hours, in contrast to which in a summer climate, when the vapor retarder according to the invention lies within the range from 60% up to 100% relative humidity, up to over 300 g/m² of moisture can dry out of the construction every 24 hours.

Vapor retarders having the described properties as well a low diffusion resistance of, for instance, 1.5 m to 2.5 m at 25% relative humidity in the ambient air are particularly well-suited for roof constructions, which vapor retarders having a higher diffusion resistance are especially suitable for well constructions.

Naturally, mixtures of different ionomers, especially of potassium ionomers with sodium ionomers are likewise suitable, whereby the proportion of potassium ionomers is preferably 5% to 95% by weight, especially 50% to 80% by weight. The latter mixtures not only display excellent vapor retarder properties but they also are easy to process into layered materials and impregnated materials.

As explained above, through the use of comonomers (c), the chemical and physical properties of the ionomers to be used according to the invention can be adapted in a known manner to special requirements, for example, in terms of compatibility with the framework and support materials, in terms of the establishment of certain $s_d$ values or else in terms of flexibility, stiffness or tear resistance.

Such especial applications-technological properties can be achieved not only by admixing the ionomers with each other, but of course also by admixing the ionomers with other polymers such as, for instance, polyamides, polyesters, polyurethanes and polyolefins. Particularly well-suited mixtures are those with copolymers consisting of ethylene and vinyl acetate as well as with copolymers made up to ethylene and butyl acrylate or ethylene and acrylic acid or ethylene and methacrylic acid or ethylene acrylic acid copolymer, or else ethylene and methyl acrylate, each with sodium ionomers and especially with potassium ionomers. In the polymer mixtures, the proportion of the ionomers preferably amounts to 30% to 95% by weight, especially 50% to 80% by weight.

Therefore, in the present case, mixtures of ionomers with each other as well as with thermoplastics serve as the ionomers, and of course also mixtures containing more than one ionomer and more than one of the other polymers.

The ionomers to be used according to the invention can be applied onto the thermal insulating materials in the form of aqueous dispersions or melts, for example, by brushing or spraying several times, unit the layers thus formed have reached an adequate thickness of 5 μm to 100 μm, preferably 10 μm to 30 μm. However, this method will only be employed if the surface of the insulating material component is markedly curved or uneven and if the laying of the films is difficult or not desired, for esthetic reasons, for example, in interiors.

When it comes to flat or cylindrical surfaces, ionomer films can be used that normally have to be attached to the insulating material by means of an adhesive since the very thin films—as a rule, they have a thickness of 5 μm to 100 μm, preferably 10 μm to 30 μm—alone are usually not sufficiently to be laid on their own.

Consequently, in the normal case, ionomers are employed in the form of self-supporting layered materials in which one of the layers is an ionomer film or ionomer layer having the indicated thickness. In order to protect this layer—which is the most important one for the purpose according to the invention—against damage of the kind that can hardly be completely prevented during production and laying, they are advantageously sandwiched between the other layers of the layered material.

These other layers, which are recommended mainly for mechanical reasons and thus also because of better handling properties, can in principle consist of any material that, in layered form, does not have a higher $s_d$ value than the ionomer layer.

Such layers are primarily skeleton layers such as nonwovens, woven fabrics or meshes made of inert substances such as polyethylene, polypropylene, polyester, glass fibers or viscose. Perforated films made of polyethylene, polypropylene and polyester are also possibilities. A high level of dimensional stability in the longitudinal and crosswise of the layered material can be achieved with layers made of paper.

It is also possible to provide these layered materials with auxiliaries, for instance, flame retardants, with which the paper sheets, for example, can be impregnated.

Aside from the ionomer layers according to the invention, such layered materials as well as their production, for example, through gluing or by means of the coating or extrusion methods, are generally know in numerous versions, so that there is no need here for any additional information on this, particularly since ionomers do not entail any special processing problems.

Layered materials having the structure presented below, each listed in the order starting with the upper layer, then the middle layer(s) and then the bottom layer, have proven their worth:

1)
paper, 80 μm to 120 μm
ionomer, 10 μm to 20 μm
paper, 80 μm to 120 μm
2)
polethylene spunbonded nonwoven, 20 μm to 60 μm
ionomer, 10 μm to 20 μm
polyethylene spunbonded nonwoven, 20 μm to 60 μm 3)
viscose nonwoven, 20 μm to 60 μm
ionomer, 10 μm to 20 μm
viscose nonwoven, 20 μm to 60 μm
4)
polyester spunbonded nonwoven, 20 μm to 60 μm
ionomer, 10 μm to 20 μm
polyester spunbonded nonwoven, 20 μm to 60 μm
5)
The above-mentioned layered materials 1) to 4) which, for purposes of enhancing the strength, contain a nonwoven or woven fabric made of polyester, glass fibers or polyethylene as an additional middle layer.

Referring to FIG. 1, a layered insulating material 10 according to the present invention includes layers 12, 14, 16 and 18. Layer 12 provides a supporting function, while layer 18 provides a protective and/or a supporting function. Layer 14 consists of an ionomer, while layer 16 is a nonwoven or woven fabric or mesh. In an embodiment layer 16 is not included.

Likewise especially suited for the purpose according to the invention are flat impregnated materials in which a nonwoven or woven fabric forms the skeleton layer and in which the skeleton layer is impregnated with ionomers as the impregnating resin. Examples of skeleton materials are polyethylene spunbonded nonwovens, polyamide spunbonded nonwovens and materials containing cellulose, especially absorbent paper. These impregnated materials not only exhibit the good properties of the corresponding layer materials, but they can also be produced particularly cost-effectively. All that is needed for this purpose is to impregnate the nonwoven or woven fabric with a melt of the ionomer and to subsequently allow the ionomer to solidify through cooling.

Figure 2:
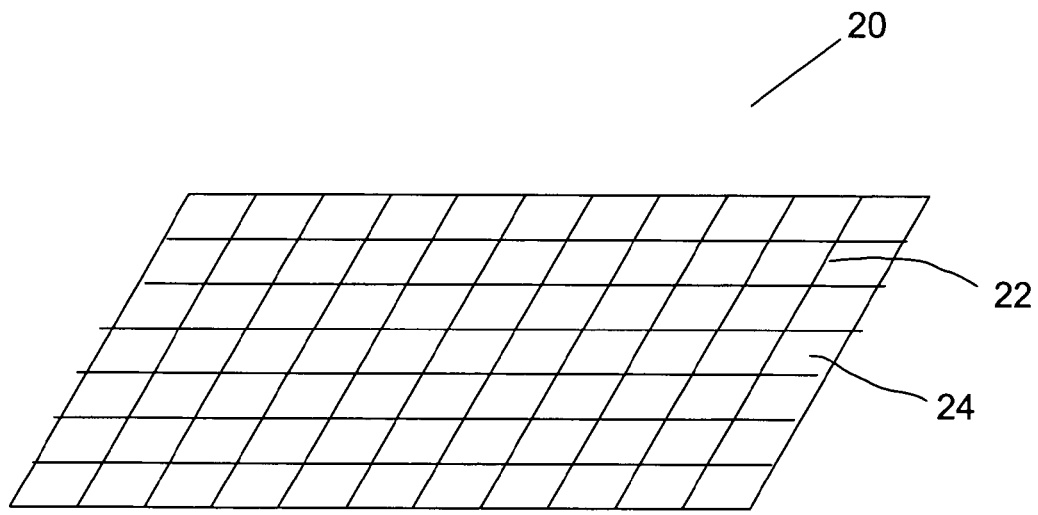
FIG. 2 shows a perspective view of a impregnated material.

Referring now to FIG. 2, a flat impregnated material 20 includes skeleton 22 and ionomers 24 impregnated into skeleton 22. Skeleton 22 is a nonwoven or woven fabric.

As is done with conventional layered materials used to seal insulation panels that are also suitable for acoustic, the layered materials or impregnated materials according to the invention can be supplied in the form of sheet rolls. Thermal insulating walls onto which the sheets have been glued and panels that are installed horizontally or obliquely under the roof can have the layered material or impregnated materials laid under them so as to self-supporting with a few intermediate attachments, whereby an air gap between the insulating material and the vapor retarder normally does not impair the effectiveness, provided that it is well sealed at the sides. Sealing of the insulating material on both sides is possible but usually this is not necessary.

EXAMPLES

Using a few ethylene/methacrylic acid ionomers of the Surlyn type manufactured by the DuPont company in accordance with the information material dated January 2001, the $s_d$ values of test films were ascertained as preliminary values according to German standard DIN 52615 employing the dry cup and wet cup methods for a thickness of 15 μm. The ionomers contained sodium cations or potassium cations as the cations. The metal ion content was determined according to German standard DIN 38406-E14.

The results are compiled in the table below:

| IONOMER | $S_D$ VALUE [M] AT A RELATIVE HUMIDITY OF: | | $\Delta S_D$ | |
|---|---|---|---|---|
| | DRY CUP 25% | WET CUP 72.5% | 25/72.5 (M) | F [3] |
| SURLYN ® 8150 [1] NA TYPE, 2.2% BY WEIGHT NA | 5.5 | 1.4 | 4.1 | 3.9 |
| SURLYN ® 8220 [1] NA TYPE, 1.9% BY WEIGHT NA | 5.0 | 1.5 | 3.5 | 3.6 |
| SURLYN ® 8945 [1] NA TYPE, 1.8% BY WEIGHT NA | 7.5 | 3.1 | 4.4 | 2.4 |
| HIMILAN ®MKI54 [2] K TYPE, 4.2% BY WEIGHT K | 1.4 | 0.09 | 1.3 | 16 |

[1] IONOMER OF THE DUPONT COMPANY
[2] IONOMER OF THE DUPONT MITSUI PETROCHEMICALS COMPANY
[3] $F = S_{D25}/S_{D72.5}$

These values directly demonstrate the excellent suitability of the ionomers as a material for vapor retarders.

What is claimed is:

1. A method for providing a vapor retarder for a building, the method comprising:
providing a film having a vapor diffusion resistance that varies as a function of the relative humidity of ambient air, wherein the film includes a mixture consisting of a polymer and an ionomer, wherein the ionomer comprises 50% to 80% by weight of the mixture, wherein the ionomer is a copolymer including: 50 mol-% to 99 mol-% ethylene; and 1 mol-% to 50 mol-% methacrylic acid; and having acid groups that are 0.5% to 100% neutralized with inorganic cations and wherein the polymer consists of a polyester, a polyurethane, or a polyolefin, or a combination thereof; and
applying the film to a building so as to provide a building vapor retarder.

2. The method as recited in claim 1 wherein the film includes an amount of the ionomer ranging from 2 to 100 g/m².

3. The method as recited in claim 1 wherein the film has a thickness ranging from 5 μm to 100 μm.

4. The method as recited in claim 1 wherein the film has a vapor diffusion resistance value of at least one of 1 to 20 m at 25% relative humidity and of 0.02 to 4 m at 72.5% relative humidity.

5. The method as recited in claim 1 wherein the vapor retarder has a vapor diffusion resistance value of 25% relative humidity that differs from the vapor diffusion resistance value at 75% relative humidity by a factor greater than 2.

6. The method as recited in claim 4 wherein the vapor diffusion resistance value at 25% relative humidity differs from the vapor diffusion resistance value at 72.5% relative humidity by a factor greater than 5.

7. The method as recited in claim 4 wherein the vapor diffusion resistance value is determined according to German standard DIN 52615.

8. The method as recited in claim 1 wherein the film is combined with at least one of a nonwoven fabric impregnated with the mixture consisting of the polymer and the ionomer, a woven fabric impregnated with the mixture consisting of the polymer and ionomer, and a layer of a self-supporting layered material including a film or layer of the mixture consisting of the polymer and the ionomer, and wherein said nonwoven fabric, said woven fabric, and said self-supporting layered material do not have a higher vapor diffusion resistance value than the film mixture.

9. The method as recited in claim 2 further comprising providing an outer layer disposed on a side of the film and configured to support or protect the film.

10. The method as recited in claim 9 wherein the outer layer has a vapor diffusion resistance value not greater than a vapor resistance value of the film.

11. The method as recited in claim 10 wherein the outer layer includes at least one of a paper, a polyethyelene spunbonded nonwoven, a polypropylene spunbonded nonwoven, a polyester spunbonded nonwoven and a viscose nonwoven material.

12. The method as recited in claim 1 wherein the ionomer is a sodium ionomer.

13. The method as recited in claim 1 wherein the ionomer is a potassium ionomer.

14. The method as recited in claim 1 wherein the ionomer is a calcium ionomer.

15. The method as recited in claim 1 wherein the inorganic cations include at least one of lithium, sodium, potassium, magnesium, calcium and zinc cations.

16. The method according to claim 1, wherein the ionomer is a copolymer of ethylene and vinyl acetate, a copolymer of ethylene and butylacrylate, a copolymer of ethylene and acrylic acid, a copolymer of ethylene and methacrylic acid, a copolymer of ethylene and acrylic acid, or a copolymer of ethylene and methacrylate, wherein the acid groups of the copolymers are partially or totally neutralized with an inorganic cation.

17. The method according to claim 1, wherein in addition to providing the film an additional layer of material is provided operatively connected to the film, the additional layer comprising a nonwoven fabric, a woven fabric, a mesh, or a perforated film and wherein said additional layer of material does not have a higher vapor diffusion resistance than the file mixture.

18. The method for providing a vapor retarder for a building, the method comprising:
providing a film having a vapor diffusion resistance that varies as a function of the relative humidity of ambient air, wherein the film includes a mixture consisting of a polymer and an ionomer, wherein the ionomer comprises 50% to 80% by weight of the mixture, wherein the ionomer is a copolymer including: 50 mol-% to 99 mol-% ethylene; and 1 mol-% to 50 mol-% methacrylic acid; and having acid groups that are 0.5% to 100% neutralized with inorganic cations and wherein the polymer consists of a polyester, a polyurethane, or a polyolefin, or a combination thereof;
providing an outer layer disposed on a side of the film and configured to support or protect the film; and
applying the film to a building so as to provide a building vapor retarder.

* * * * *